March 21, 1961

L. E. GROGAN 2,976,085

SAFETY BRAKE UNIT

Filed Sept. 23, 1958

LEO E. GROGAN
INVENTOR.

BY Paul A. Weilein
ATTORNEY

March 21, 1961 L. E. GROGAN 2,976,085
SAFETY BRAKE UNIT
Filed Sept. 23, 1958 3 Sheets-Sheet 2

LEO E. GROGAN
INVENTOR.

BY Paul A. Weikin
ATTORNEY

LEO E. GROGAN
INVENTOR.

BY Paul A. Weilein
ATTORNEY

United States Patent Office 2,976,085
Patented Mar. 21, 1961

2,976,085

SAFETY BRAKE UNIT

Leo E. Grogan, Downey, Calif.
(1300 W. Pacific Coast Highway, Harbor City, Calif.)

Filed Sept. 23, 1958, Ser. No. 762,780

5 Claims. (Cl. 303—9)

This invention relates to safety mechanism for fluid pressure actuated brakes, particularly air brake units of trucks, trailers, and similar vehicles.

It is known that spring-actuated, fluid pressure controlled safety brake units of the type to which this invention relates have been used. The construction and arrangement of these units is such that numerous parts thereof are exposed to a fluid pressure essential to provide for a safety operation of such units. These parts require the use of O-ring seals, piston rings, and other sealing elements.

The spring means employed in these safety units operate to apply the brakes when the fluid pressure fails or drops below a predetermined value. Fluid pressure responsive means are required to maintain the spring means compressed and in readiness for operation so that upon failure or a predetermined reduction of such pressure, the force of the spring means becomes effective for applying the brakes.

Strong spring means are desired to assure adequate braking action. Accordingly, the use of such strong spring means necessitates an increased fluid pressure to hold the spring means compressed. Moreover, these units at times are subjected to fluid pressures of the order of 120 p.s.i. and upward and one or more of the seals such as heretofore used may fail under such pressures.

Instances of failure of such safety units have been known to have been caused by failure of one or more of the seals. Moreover, in having a number of the parts of these units exposed to high fluid pressure and in requiring a number of seals such as hereinbefore noted, the likelihood of seal failure is increased.

It is an object of this invention to provide an improved safety brake unit of the character described which is constructed and arranged in a novel manner to eliminate the objections and the failure hazards heretofore present in similar units and to assure that a reliable and positive braking action will be effected incident to failure of the fluid pressure or the reduction of such pressure below a predetermined value.

It is another object of this invention to provide a safety brake unit such as described which is constructed and arranged so that a flexible diaphragm forms a seal that will reliably withstand the fluid pressures to which the unit is subjected and is the only seal required therein to assure a reliable brake applying operation.

It is an additional object of this invention to provide a safety brake unit such as described wherein a novel construction and arrangement of a housing, a diaphragm, spring means and actuating means for applying the force of the spring means to elements for actuating a vehicle brake, make it possible to simplify the construction of the unit and eliminate the use of numerous parts and seals herebefore employed.

Another object of this invention is to provide a novel unitized and compact safety brake assembly which consists of a service air brake actuating unit and a safety brake actuating unit arranged whereby the assembly is subject to being easily applied to trucks, trailers, and the like as a replacement device for a conventional air brake operating unit.

Another object hereof is the provision of a safety brake assembly which readily lends itself to use of a number thereof in a conventional air brake system of a truck, trailer, or the like, in such a manner that all of the brakes are subject to emergency safety actuation under the force derived from novel spring means and applied through novel force-applying means in such units, in response to manipulation of an emergency control valve in the system, as well as incident to pressure failure in the system.

It is another object of this invention to provide a brake assembly such as described which is constructed and arranged so that when the service unit thereof is operated and it is desired to provide a greater brake actuating force than afforded by the service unit, this readily may be accomplished by intentionally actuating the safety unit, as for example, by appropriate manipulation of an emergency valve connected with the safety unit.

It is a further object hereof to provide a novel assembly comprising a service brake unit and safety brake unit such as described, wherein the safety unit is constructed and arranged so that it will be automatically operated in case of failure of air pressure, to provide a greater force for applying brakes than afforded by the service unit, thereby assuring a reliable emergency braking action.

Other objects and advantages of the invention will be hereinafter described or will become apparent to those skilled in the art, and the novel features thereof will be defined in the appended claims.

The invention will be more readily understood upon reference to the accompanying drawings wherein.

Figure 1:
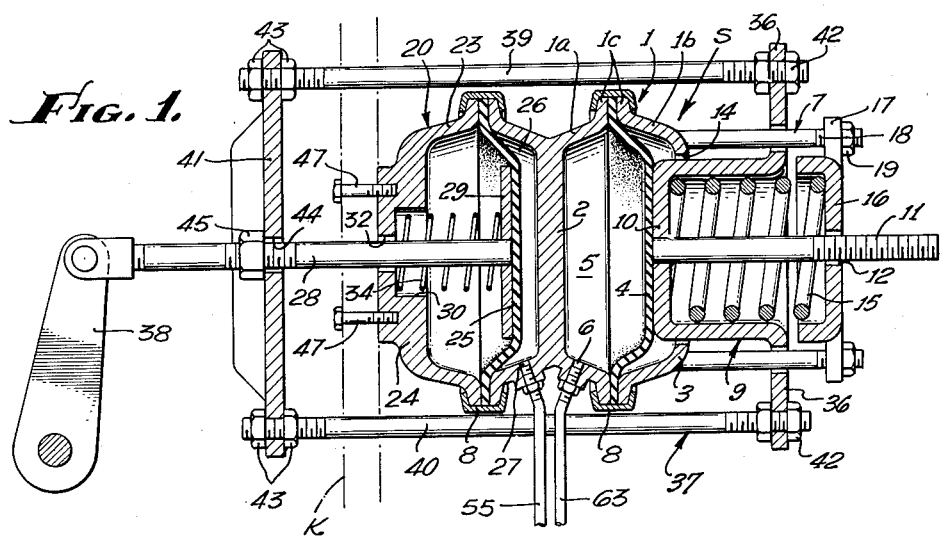
Fig. 1 is a sectional view of a safety brake assembly embodying the present invention showing the service brake unit in brake releasing position and the safety unit in readiness for an emergency operation.

A safety brake unit embodying this invention, as here shown, is generally designated S and adapted for use in connection with air brakes. It includes a sectional safety housing 1 provided with a pair of opposed walls 2 and 3 between which a flexible diaphragm 4 is peripherally secured so as to form in the housing an air tight safety chamber 5. A port 6 in the housing 1 provides for the introduction of air under pressure into the chamber 5 and for release of the air pressure therefrom in a manner which will be hereinafter described.

In accordance with this invention, the housing 1 and spring-loaded force applying means generally designated 7 are constructed and arranged so that the single diaphragm 4 provides the only seal required to assure that a reliable application of the force of the spring load of the force applying means will be transmitted for applying brakes in the event the pressure in the safety chamber 5 is reduced below a predetermined value. This arrangement eliminates numerous seals heretofore required in safety devices for air brakes and removes all likelihood of failure of the safety unit by reason of seal failure, inasmuch as the seal afforded by the diaphragm will withstand pressures to which the unit is subjected, whereas O-ring seals and other sealing elements have been known to leak under pressures of the order of 120 p.s.i. and upward.

As here shown, the safety housing 1 is composed of two cup like sections 1a and 1b which provide the opposed walls 2 and 3 and peripheral abutting flanges 1c which clamp the peripheral portion of the diaphragm 4 therebetween. Conventional means such as a split channeled ring 8 held in place by suitable clamping means (not shown), may be employed to provide an air tight joint of the housing sections with the diaphragm clamped therebetween so as to form a reliable seal for the safety chamber 5.

The spring loaded force applying means 7 includes a cup-like spring retaining member 9 having a bottom wall 10, the flat outer surface of which abuts the outer face of the diaphragm 4 but is not attached or secured to the diaphragm. The section 1b of the housing 1 has a large opening 14 in the wall 3 thereof to accommodate the member 9 which, as will be hereinafter described, is freely movable and floatingly supported with respect to the wall 3 without contact therewith.

A coiled spring 15 is mounted in the cup-like member 9 so as to be confined between the bottom wall 10 and a stationary spring keeper 16 fixed to the housing section 1b in outwardly spaced relation thereto. The keeper 16 embraces the outer end of the spring 15 and is provided with apertured ears 17 for reception of bolts 18 that are fixed as by welding or otherwise to the housing section 1b and extend outwardly therefrom. Nuts 19 are mounted on the threaded outer ends of the bolts 18 so as to abut the ears 17 to hold the keeper 16 in place. The force of the spring 15 may be varied by adjusting the nuts 19 so as to move the keeper 16 axially on the bolts 18.

It should be noted that with the spring 15, at all times, is under such compression between the member 9 and the keeper 16, as here shown, that the force-applying means, that is, the member 9, is maintained in centered position against the diaphragm and is floatingly supported and freely movable with the diaphragm without depending upon bearing contact thereof with the housing section 1b or the bolts 18.

A rod 11 is fixed, as by welding, to the center of the bottom wall 10 of the member 9 and extends outwardly therefrom through an opening 12 in the keeper 16. The outer end of this rod 11 is screw threaded and projects beyond the outer face of the keeper 16 at all times. A nut, not shown, may be applied to the screw threaded outer end of the rod 11 so as to engage the keeper 16 to restrain movement of the rod and thereby render the spring 15 inoperable. This will prevent the safety unit from applying a braking force and in some instances, may be desirable.

Figure 2:
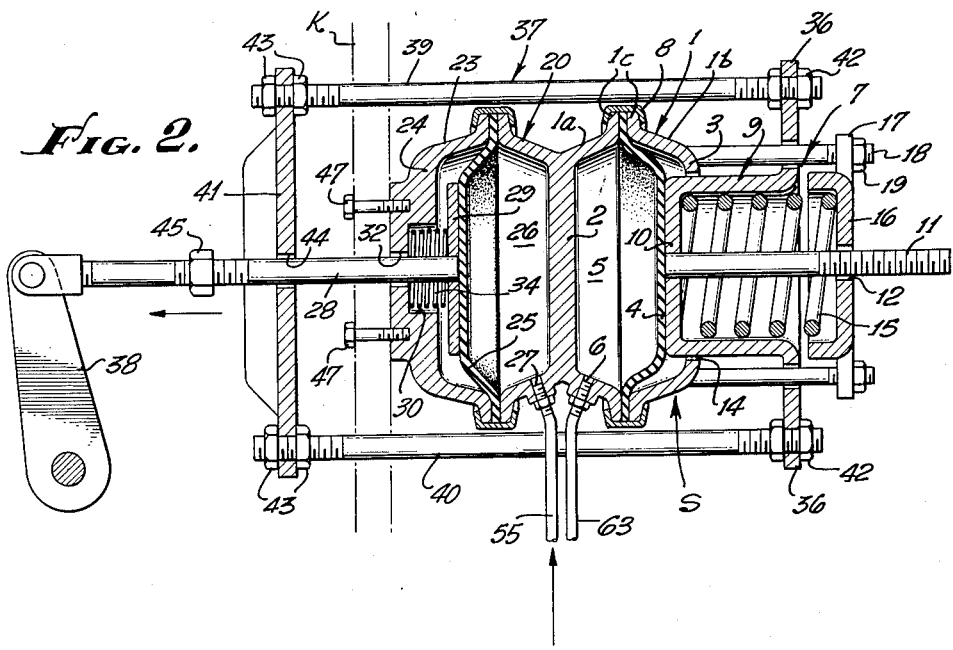
Fig. 2 is a sectional view corresponding to Fig. 1, showing the service unit in brake applying position and the safety unit in readiness for a safety or emergency operation.
Figure 3:
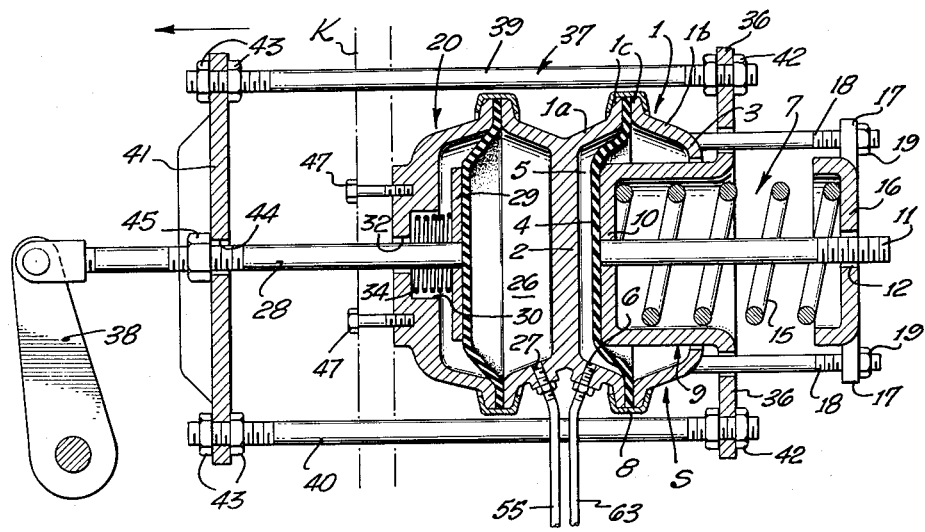
Fig. 3 is a sectional view corresponding to Figs. 1 and 2, showing the positions of the parts of the service and safety units as when the safety unit is automatically operated for effecting an emergency braking operation incident to failure of the air pressure.

Referring more specifically to an embodiment of this invention as shown in Figs. 1, 2, and 3, it is seen that it includes a service brake actuating unit 20 with which is combined a safety brake unit S of the character hereinbefore described, to form a brake assembly which may be applied to the mounting bracket or frame member K used for mounting a conventional service air brake unit of the type employed in trucks, trailers, and similar vehicles.

The service brake unit 20 includes a sectional housing 23 which as here shown, comprises an outer wall 24 and an inner wall which latter in fact, also serves as the wall 2 of the safety housing 1. Obviously, these housings could be made as separate units fastened one to the other instead of having the common wall as here shown.

A flexible diaphragm 25 is peripherally secured between the sections of the housing 23 in the same manner as the diaphragm 4 so as to form with the wall 2 a service brake chamber 26. A port 27 in the housing 23 provides for the introduction of air under pressure into the chamber 26 and for release of air therefrom.

A brake actuating rod 28 is fixed at its inner end to a plate 29, as by being welded thereto, and the plate abuts the diaphragm 25 to move therewith. The outer wall 24 is provided with an opening 32 through which the rod 28 is slidable with respect to the housing wall 24.

A coiled spring 34 having less force than the spring 15 is confined on the rod 28 between the wall 24 and the plate 29, to normally hold the diaphragm and rod in brake releasing position. The spring 34 is confined in a recess 30 in the wall 24 and provides for a floating support of the rod 28 with respect to the housing wall 24.

As a means for operatively connecting the safety unit S with the brake actuating rod 28 of the service unit 20, the member 9 is provided with a pair of radial arms 36, here shown as 180 degrees apart. These arms form a part of a yoke structure 37 which is operatively connected with the rod 28 so as to move the latter for applying a brake under the force of the spring 15. As here shown, the rod 28 is connected to a crank or lever arm 38 which, latter in this instance, diagrammatically represents conventional mechanical linkage for applying and releasing a vehicle brake, not shown.

The yoke structure 37 includes a pair of rods 39 and 40 which connect the radial arms 36 with a brake actuating bar 41. Nuts 42 and 43 secure the rods 39 and 40 to the arms 36 and the bar 41 respectively. The bar 41 has an opening 44 therein for slidably accommodating the rod 28. A stop member on the rod in the form of an axially adjustable nut 45 is engageable by the bar 41 to move the rod into the brake applying position shown in Fig. 3, when the safety brake unit is actuated. In service operation of the brake unit 20, as shown in Fig. 2, the rod 28 is movable freely relative to the bar 41.

The housing 23 of the service unit 20 may be fixed as shown, to the frame or bracket K of a vehicle by means of fastenings 47. In this connection, it should be noted that as shown in Figs. 1, 2, and 3, a safety brake assembly embodying the present invention is of a simple and compact construction by reason of the fixing of the housings 1 and 23 one to the other, and in having the yoke structure 37 closely embrace the two housings and floatingly supported without having contact with the housings.

Figure 5:
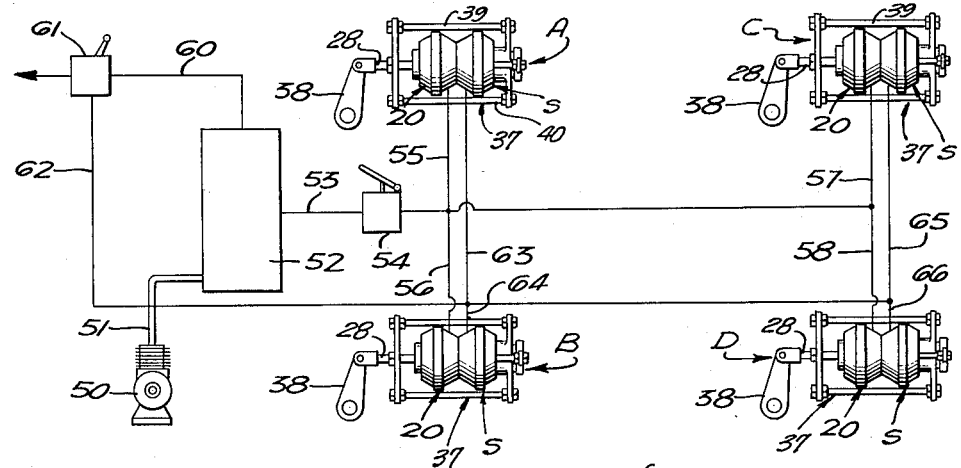
Fig. 5 is a schematic view of a typical air brake system equipped with a plurality of the safety brake assemblies shown in Figs. 1, 2, and 3.

Fig. 5 diagrammatically illustrates an air brake system of a motor vehicle embodying a number of the safety brake assemblies shown in Figs. 1 and 2, there being four of such assemblies designated A, B, C, and D. In this system, a compressor 50 supplies air under pressure through a line 51 to a reservoir 52. A service line 53 leads from the reservoir through a pedal operated service brake control valve unit 54, and by means of branch lines 55, 56, 57 and 58, is coupled to the service brake chambers 26 of the service brake units 20 of the assemblies A, B, C, and D. The pedal operated valve 54 provides for actuation of the service brake units 20 in the conventional manner. Upon depressing the pedal of the valve unit 54, air from the reservoir becomes effective in the service chambers 26 to move the diaphragms 25 and brake actuating rods 28 to the brake applying position. Release of the pedal of the valve 54 unit causes the air pressure to be relieved from the chambers 26 through the valve in the usual manner, whereby the springs 34 will return the rods 28 and diaphragm 25 to the brake releasing position.

The safety brake chambers 5 of the safety units S of the assemblies A, B, C, and D, are supplied with air under pressure by a line 60 extending from the reservoir 52 to a manually operable valve unit 61, thence through a line 62 and branch lines 63, 64, 65, and 66, communicating respectively with the safety chambers 5 through the ports 6. The manually operable valve unit 61 is operable to control the supply of compressed air to the safety chambers 5 and to release air pressure from these chambers.

Normally, the air pressure in the safety chambers 5 is maintained at a value such that the diaphragms 4 will hold the springs 15 compressed as shown in Fig. 1.

Should the air pressure fail or become reduced, for example, below 60 p.s.i., the springs 15 in the safety units will become effective to move the yoke structures 37 so as to move the brake actuating rods 28 for applying the brakes.

If the driver of the vehicle finds it desirable to effect an emergency operation of the brakes through actuation of the safety units, this may be accomplished by moving the valve 61 into position to vent air from the safety chambers 5, whereby the springs 15 will be effective to actuate the brakes.

Figure 6:
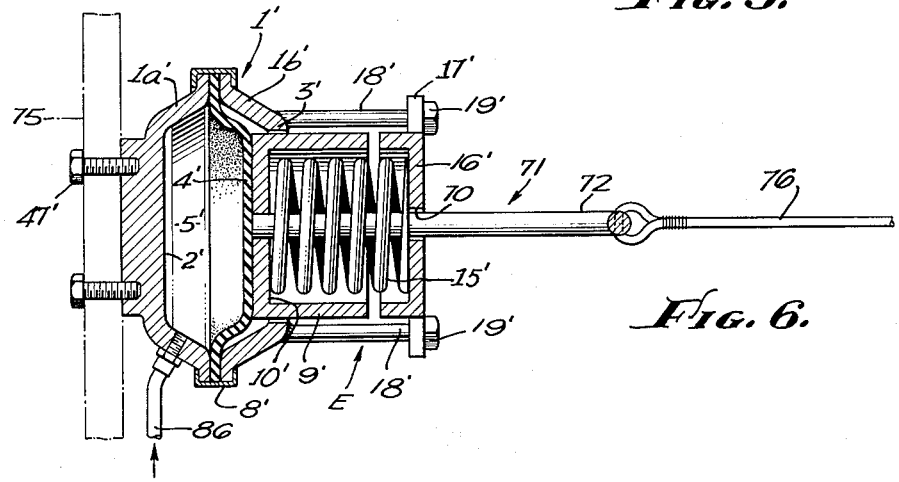
Fig. 6 is a longitudinal sectional view of another modified form of this invention.
Figure 7:
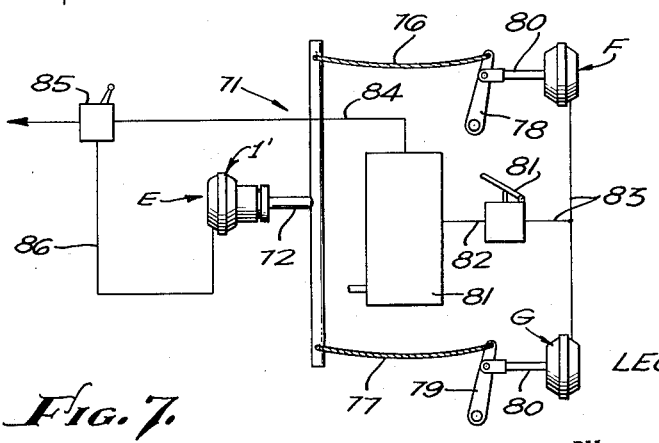
Fig. 7 is schematic view of an air brake system embodying the modified form of the invention shown in Fig. 6.

A safety unit of this invention employed in the manner shown in Figs. 6 and 7, for the most part, is of the same construction as the safety unit shown in Figs. 1 and 2 except for the yoke structure 37 in the unit shown in Figs. 1, 2, and 3. Accordingly, the parts thereof that correspond to parts shown in Figs. 1–3, are identified in Figs. 6 and 7 by the same reference characters accompanied by the prime character.

Since, as shown in Fig. 7, a single safety unit designated E is employed to actuate the service brake units F and G of an air brake system, the means for connecting the force applying member 9' of the unit E with these air brake units is somewhat different from that shown in Figs. 1, 2, and 3. Accordingly, the spring keeper 16' is provided with an opening 70 to slidably accommodate a T-shaped brake actuating member 71. The shank 72 of the T-shaped member 71 is fixed as by welding to the bottom wall 10' of the member 9'. The bottom wall 10 abuts the diaphragm 41 in the same manner as shown in Figs. 1, 2, and 3 and no seal is required other than that provided by the diaphragm.

With the safety unit E mounted as shown in Figs. 6 and 7, upon a stationary part 75 of a vehicle having air service brake units F and G, the unit E may be operatively connected with the air brake unit F and G by means of the T-shaped member 71 and flexible elements 76 and 77 which latter join the member 71 with the brake actuating levers 78 and 79. The levers 78 and 79 are connected with brake actuating rods 80 for units F and G which latter, for example, may be of the same construction as the service brake units 20 shown in Figs. 1 and 2.

The air brake system shown in Fig. 7 includes a reservoir 81 supplied with air under pressure from the usual compressor, not shown. A pedal operated service brake value unit 87 controls the flow of air from a service line 82 to lines 83 leading to the brake units F and G.

The safety unit E is supplied with air under pressure from the reservoir through a line 84 to a manually operable valve 85 and from this valve by a line 86 which communicates with the safety chamber 5' in unit E. In this system, the one safety unit E serves through the T-shaped member 71 and the flexible elements 76 and 77, to effect an emergency operation of brakes that in service operation, are normally operated by the units F and G. In this safety operation, the unit E operates in the same manner as the safety unit shown in Figs. 1–3.

Figure 4:
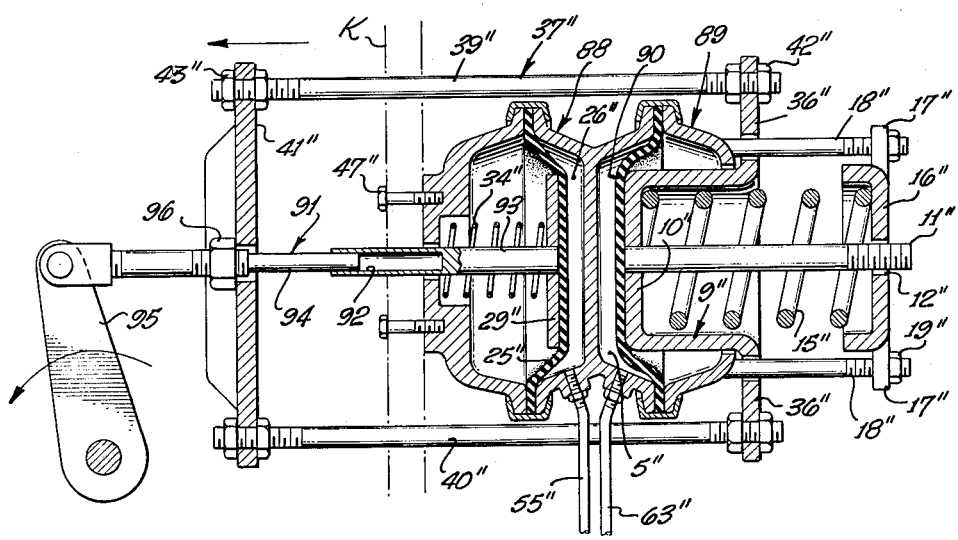
Fig. 4 is a sectional view similar to Figs. 1, 2, and 3, of a modified form of this invention.

The modified form of this invention shown in Fig. 4 comprises an assembly made up of a service brake unit 88 unitized with the safety brake unit 89 in substantially the same manner as shown in Figs. 1, 2, and 3. These units are of substantially the same construction as the units shown in Figs. 1, 2, and 3 and for this reason, the parts corresponding to those shown in Figs. 1, 2, and 3 are identified by the same reference numerals accompanied by the double prime character.

The purpose of the modified form is to provide an operative connection of the safety unit 89 with the service unit 88 such that the safety unit will be capable of applying a greater brake actuating force than the service unit. One advantage of this arrangement is that in an emergency operation of the safety unit when pressure failure takes place, a strong and reliable braking force will be effective at the time when most needed. Another advantage is that in case the service brake unit fails to provide the desired braking action when fully actuated or applied, the safety unit may be intentionally operated by appropriate movement of a manually operable valve, to apply a reliable brake actuating force.

These advantageous operations are made by exceptionally simple changes in an assembly such as shown in Figs. 1, 2, and 3, it only being necessary to provide in the safety unit of such an assembly, a diaphragm 90 capable of a somewhat greater axial movement than the diaphragm in the service and safety units respectively, shown in Figs. 1, 2, and 3, and to provide a slidable telescopic joint in a sectional brake actuating rod 91 that corresponds to the rod 28 in the assembly shown in Figs. 1, 2, and 3.

As shown in Fig. 4, the slidable telescopic joint in the sectional rod 91 is provided by a means of tubular portion 92 in a section 93 of the rod, for slidably receiving an end of the rod section 94. The rod section 93 is engaged with the diaphragm 25" of the service unit 88, whereas the rod section 94 is connected with the crank arm 95 which latter, in this instance, like the crank arm 38 in Figs. 1, 2, 3, and 5, diagrammatically represents conventional mechanical linkage for applying a brake, not shown.

A stop nut 96 corresponding to the nut 45 shown in Figs. 1, 2, and 3, is axially adjustably mounted on the rod section 94 so as to be engageable by the actuating bar 41" of the yoke structure 37". With this arrangement, the rod section 94 is bottomed in the inner end of the tubular portions 92 of the rod section 93 when the diaphragm 25" in the service unit 88 is in brake releasing position, as well and when this diaphragm is in brake applying position, provided in the latter instance, the safety unit 89 is not in operation. The force derived from the brake (not shown) upon release of the brake, is applied through the crank arm 95 to the rod section 94 to normally urge the rod 94 into bottomed position in the tubular section 92 of the rod section 93.

When the service brake unit 88 is operated, the rod 91 acts as a unit independently of the bar 41" to apply the braking force through the crank arm 95.

Should failure of air pressure take place, the safety unit 89 will operate in the same manner as described in connection with the safety unit shown in Figs. 1, 2, and 3, so that the spring 15" thereof will move the yoke unit 37", whereby through the bar 41" engaging the nut 96, the rod section 94 will be moved relative to the rod section 93, to apply a braking force through the crank arm 95. As the diaphragm 90 is capable of a greater axial movement under the force of the spring 15" than the diaphragm 25" in the service unit, it is seen that the safety unit will apply through the crank arm 95, an effective brake actuating force and thereby provide an added safety measure most essential in such an emergency.

Likewise, this greater braking force may be applied when assemblies such as shown in Fig. 4 are employed in a brake system, as shown in Fig. 5, in the event the service brake unit after being operated fails to effect the desired braking action. In such case, the vehicle operator, upon appropriate movement of a manual valve corresponding to the valve 61, may release air from the safety chambers 5" so that the safety devices will become operative to move the rod sections 94 relative to the sections 93 to apply the braking force derived from the safety unit, At the time of this actuation each of the rod sections 94 will be moved somewhat from bottomed position in the associated tubular section 92 of the rod section 93, and this increment of movement assures that an effective braking force will be applied to the brakes.

It will now be apparent that a safety brake unit embodying this invention, employed either as a combined service brake actuating unit and safety unit as shown in Figs. 1–4, or used as shown in Figs. 6 and 7, constitutes an improvement in this art in point of simplicity of construction, ease of substitution for a conventional brake actuating unit, and reliability of performance. These advantages are made possible by the construction and arrangement of the housing and diaphragm forming the safety chamber, and the manner in which spring loaded force applying means is constructed and combined with the housing so that the one diaphragm forms the only seal required.

I claim:

1. A safety device for an air brake actuating unit comprising: a housing having opposed walls and means for mounting said housing on a stationary support; a flexible and imperforate diaphragm peripherally secured between said walls and forming with one of said walls a safety chamber sealed exclusively by said diaphragm; said housing having means for introducing fluid under pressure into said chamber and for relieving pressure therefrom; the other of said walls having an opening therein; a cup-like spring retaining member unconnected to and having abutting engagement only with said diaphragm; said member extending outwardly through said opening and free of contact with said housing; a spring keeper member; means supporting said keeper member in outwardly spaced relation to said other wall; a coiled spring confined between said retaining member and said keeper member so that said spring will be maintained compressed by the fluid pressure response of said diaphragm at a fluid pressure in said chamber above a predetermined value; and means operatively connected with said retaining member adapted to be connected with said unit for transmitting thereto a brake actuating force derived from said spring incident to reduction of said pressure below said value.

2. A safety device for an air brake actuating unit comprising: a housing having opposed walls and means for mounting said housing on a stationary support; a flexible and imperforate diaphragm peripherally secured between said walls and forming with one of said walls a closed safety chamber; said housing having means for introducing fluid under pressure into said chamber and for relieving pressure therefrom; the other of said walls having an opening therein; a cup-like spring retaining member having its bottom unconnected to and rested against said diaphragm; said retaining member extending through said opening; a spring keeper member; means fixed to said other wall and extending outwardly therefrom supporting said keeper member in opposed relation to said retaining member; a coiled spring mounted in said retaining member so as to be compressed between said bottom and said keeper member by the fluid pressure response of said diaphragm at a fluid pressure in said chamber above a predetermined value; said spring retaining member being spaced from contact with said other wall and having an end extending outwardly through said opening; and means connected with said end of said retaining member adapted to be connected to said unit for transmitting thereto a brake actuating force derived from said spring upon reduction of said fluid pressure below said value.

3. A safety device for an air brake actuating unit comprising: a housing having opposed walls and means for mounting said housing on a stationary support; a flexible diaphragm peripherally secured between said walls and forming with one of said walls a closed safety chamber; said housing having means for introducing fluid under pressure into said chamber and for relieving pressure therefrom; the other of said walls having an opening therein; a spring retaining member engaging said diaphragm and movable freely through said opening; a spring keeper member; means fixed to said housing for supporting said keeper member in outwardly spaced relation to said other wall; a coiled spring confined between said retaining member and said keeper member so that said spring will be maintained compressed by fluid pressure response of said diaphragm at a fluid pressure in said chamber above a predetermined value; a pair of arms extending from said retaining member exteriorly of said housing; a pair of rods fixed to said arms and extending therefrom on opposite sides of said housing; a brake actuating member carried by said rods adapted to transmit to said unit a braking force derived from said spring incident to reduction of said pressure below said valve; and a rod fixed to said retaining member and projecting therefrom; said keeper member having an opening through which said rod extends; said rod having means thereon for reception of a stop member to engage the keeper member to restrain spring effected movement of said retaining member.

4. An air brake safety assembly comprising: a housing having a diaphragm secured therein between a pair of walls thereof and forming with one of said walls a closed chamber; said housing having means for introducing fluid under pressure into said chamber; a brake actuating rod; means on said rod engaged with said diaphragm; the other of said walls having an opening therein through which said rod is freely movable into and from brake applying position; spring means confined between said other wall and said diaphragm for urging said diaphragm and rod into brake releasing position; a safety housing fixed in relation to said first mentioned housing; said safety housing having a pair of opposed walls and an imperforate diaphragm secured therein and forming with one of the walls of the safety housing, a closed safety chamber; said safety housing having means for introducing fluid under pressure into said safety chamber; a cup-like spring retaining member having its bottom free from connection with and disposed to abut the diaphragm in said safety housing; the other wall of said safety housing having an opening therein; said retaining member being movable freely in said opening in said other wall of said safety housing; a spring keeper; a pair of rods extending from said safety housing supporting said keeper in outwardly spaced relation to said safety housing; a coiled spring confined between said keeper and said retaining member so as to be compressed by the fluid pressure response of said diaphragm at pressures in said safety chamber above a predetermined value; a pair of arms on said retaining member; said arms having openings therein through which said rods extend; a pair of connecting members joined to said arms; a bar supported by said connecting members; said last named spring moving said retaining member, said arms, said connecting members and said bar into brake applying position incident to reduction of said pressure in said chamber below said valve; and a member on said brake actuating rod engageable by said bar to move said rod into brake applying position.

5. A safety air brake assembly comprising: a service air brake unit having an actuating member movable into and from brake applying position; a housing fixed in relation to said unit; said housing having a pair of opposed walls; an imperforate diaphragm peripherally secured between said walls to form between one side thereof and one of the walls a closed safety chamber; said housing having means for introducing fluid under pressure into said chamber and relieving fluid pressure therefrom; the other of said walls having an opening therein; a cup-like spring retaining member unconnected to and having abutting contact only with the other side of said diaphragm and movable freely in said opening; a spring keeper; means fixed to said other wall supporting said keeper in outwardly spaced relation to said other wall; a coiled spring confined between said retaining member and said keeper so as to be compressed by the response of said diaphragm to a fluid pressure in said safety chamber above a predetermined value; a yoke structure joined to said retaining member and embracing said housing and said unit in spaced relation thereto; said spring moving said retaining member and yoke structure into brake applying position incident to reduction of said fluid pressure in said chamber below said predetermined value; elements on said yoke structure and said actuating member of said service brake unit respectively, cooperable to move said actuating member into brake applying position only in response to said spring effected movement of said retaining member and yoke into said brake applying position; and a rod fixed to said spring retaining member and extending therefrom past said keeper member; said rod having means for mounting a stop member for engaging said keeper member to prevent spring effected movement of said yoke structure.

References Cited in the file of this patent

UNITED STATES PATENTS

| | | |
|---|---|---|
| 2,409,908 | Simpkins | Oct. 22, 1946 |
| 2,754,805 | Beman | July 17, 1956 |
| 2,757,763 | Burger | Aug. 7, 1956 |
| 2,846,983 | Otto | Aug. 12, 1958 |
| 2,852,316 | Staley | Sept. 16, 1958 |
| 2,854,954 | Howze | Oct. 7, 1958 |
| 2,862,583 | Granche | Dec. 2, 1958 |

FOREIGN PATENTS

| | | |
|---|---|---|
| 639,090 | Germany | Nov. 28, 1936 |
| 687,793 | Great Britain | Feb. 18, 1953 |

UNITED STATES PATENT OFFICE

CERTIFICATION OF CORRECTION

Patent No. 2,976,085            March 21, 1961

Leo E. Grogan

It is hereby certified that error appears in the above numbered patent requiring correction and that the said Letters Patent should read as corrected below.

Column 8, lines 16 and 58, for "valve", each occurrence, read -- value --.

Signed and sealed this 15th day of August 1961.

(SEAL)
Attest:

ERNEST W. SWIDER            DAVID L. LADD
Attesting Officer            Commissioner of Patents